United States Patent [19]

Nace

[11] Patent Number: 4,757,104

[45] Date of Patent: Jul. 12, 1988

[54] GAMMA RADIATION RESISTANT CARBONATE POLYMER COMPOSITIONS CONTAINING LINOLENIC COMPOUNDS

[75] Inventor: Vaughn M. Nace, Lake Jackson, Tex.

[73] Assignee: The Dow Chemical Company, Midland, Mich.

[21] Appl. No.: 11,562

[22] Filed: Feb. 6, 1987

Related U.S. Application Data

[63] Continuation-in-part of Ser. No. 848,066, Apr. 4, 1986, abandoned.

[51] Int. Cl.$^4$ .......................... C08K 5/10; C08K 5/34
[52] U.S. Cl. .................... 524/211; 524/318; 524/322
[58] Field of Search ............... 524/211, 318, 322; 523/123, 125

[56] References Cited

U.S. PATENT DOCUMENTS

| | | | |
|---|---|---|---|
| 3,186,961 | 6/1965 | Sears | 524/114 |
| 3,836,499 | 9/1974 | Sehirmer et al. | 524/318 |
| 4,360,606 | 11/1982 | Tobias et al. | 523/125 |
| 4,408,000 | 10/1983 | Lee | 524/318 |

FOREIGN PATENT DOCUMENTS 0152012 8/1985 European Pat. Off. .

*Primary Examiner*—Veronica P. Hoke
*Attorney, Agent, or Firm*—B. G. Colley

[57] ABSTRACT

Carbonate polymer compositions are rendered gamma ray resistant by the incorporation of 100 to 50,000 ppm of one or more linolenic compounds. Compared to the controls, the compositions of the invention have a reduced yellowing after exposure to cobalt 60 radiation.

7 Claims, No Drawings

GAMMA RADIATION RESISTANT CARBONATE POLYMER COMPOSITIONS CONTAINING LINOLENIC COMPOUNDS

CROSS REFERENCE TO RELATED APPLICATIONS

This application is a continuation-in-part of Ser. No. 848,066 filed Apr. 4, 1986 now abandoned.

BACKGROUND OF THE INVENTION

This invention relates to a gamma radiation resistant carbonate polymer composition wherein the polycarbonate polymer is rendered radiation resistant by the incorporation of an effective amount of one or more linolenic compounds.

There is a distinct need for polycarbonate moldings that are resistant to gamma radiation so that they can be sterilized without substantial loss of clarity and physical characteristics.

It is known that polyolefins can be rendered radiation resistant by the addition of benzhydrol, hydrocarbon oils, phthalic esters, and benzaldehyde acetals. See for example U.S. Pat. Nos. 4,431,497, 4,460,445; and 4,467,065.

It is also known that blends of polycarbonate resins and polyethylene terephthalate are resistant to gamma rays. Modern Plastics January 1984 page 104: Plastics World December 1983 pages 68 and 69.

The use of various stabilizer compounds such as esters, alcohols, thioesters, thiadiazoles, thiourea, phosphonates, phosphonites, and diphosphonites is disclosed in EP-0152,012.

SUMMARY OF THE INVENTION

The present invention is a carbonate polymer having improved gamma radiation stability due to the incorporation of one or more linolenic compounds in an amount sufficient to improve the gamma radiation resistance.

In general, this effective amount has been found to be in the range from 100 to 50,000 parts per million. A preferred range is 2500 to 15,000 ppm and the most preferred range is 5000 to 10,000 ppm.

DETAILED DESCRIPTION OF THE INVENTION

The carbonate polymers employed in the present invention are advantageously aromatic carbonate polymers such as the trityl diols carbonates described in U.S. Pat. Nos. 3,036,036, 3,036,037, 3,036,038 and 3,036,039, polycarbonates of bis(ar-hydroxyphenyl)-alkylidenes (often called bisphenol-A type diols) including their aromatically and aliphatically substituted derivatives such as disclosed in U.S. Pat. Nos. 2,999,835, 3,038,365, and 3,334,154, and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or interpolymer rather than a homopolymer is desired. Also suitable for the practice of this invention are blends of anyone of the above carbonate polymers. Also included in the term carbonate polymer are the ester/carbonate copolymers of the types described in U.S. Pat. Nos. 3,169,121, 4,287,787, 4,156,069, 4,260,731 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The linolenic compounds used in this invention are commercially available or can be made from the commercial materials by known techniques. These linolenic compounds have the formula

$$CH_3+(CH_2-CH:CH)_3(CH_2)_7C(O)-X$$

where X is —OH, —NR$_1$R$_2$ or —OR and R is an alkyl group of 1 to 18 carbons, R$_1$ and R$_2$ are independently hydrogen or alkyl groups of 1 to 4 carbons.

A specific example of the useful linolenic compounds is linolenic acid. This acid has the IUPAC or system name of 9, 12, 15-octadecatrienoic acid.

Also useful in this invention are the esters of linolenic acid with methyl alcohol and its homologs up to an including stearyl alcohol.

The linolenic acid can be converted to amides by reacting the acid with a substituted or unsubstituted amine. The amines can be primary or secondary amines substituted with alkyl groups of one to four carbon atoms.

The following examples are presented to further illustrate but not limit the invention.

EXAMPLES 1 and 2

Samples were prepared by adding 5 gram amounts of unsaturated fatty acids and esters to 1400 grams of polycarbonate resin pellets followed by agitation to disperse said additive. Each sample was then extruded on a 1.5 inch single-screw extruder. The resulting strand-chopped pellets were injection molded to yield test discs of 2 inch diameter by ⅛ inch thick. Each sample is listed below along with the corresponding amounts of additive, beginning yellowness index, and final yellowness index after exposure to 3.2 Mrad of Cobalt-60 gamma radiation. ASTM Yellowness Index Test D-1925 was used to measure the relative yellowing between the sample containing the additive and the control. The results are shown in Table I where the percent reduction in yellowness over the control resin is tabulated.

TABLE 1

| Sample | Additive Amount (ppm) | YI Initial | YI Final | ΔYI | % Reduction |
|---|---|---|---|---|---|
| Control 1 | 0 | 4.7 | 26.0 | 21.3 | 0 |
| Control 2 (oleic acid) | 3,571 | 5.2 | 29.3 | 24.1 | (13.1% increase) |
| Control 3 (linoleic acid) | 3,571 | 5.7 | 27.2 | 21.5 | 0 |
| Ex. 1 (linolenic acid) | 3,571 | 7.3 | 26.3 | 19.0 | 11.6 |
| Ex. 2 (methyl linolenate) | 3,571 | 5.5 | 23.5 | 18.0 | 16.3 |

I claim:

1. A carbonate polymer composition with improved resistance to gamma radiation which comprises a carbonate polymer and a gamma radiation resistance improving amount of one or more linolenic compounds having the formula

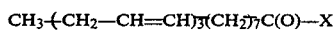

where X is [—OH,] —NR$_1$R$_2$ or —OR and R is an alkyl group of 1 to 18 carbons, R$_1$ and R$_2$ are independently hydrogen or alkyl groups of 1 to 4 carbons.

2. The carbonate composition as set forth in claim 1 wherein the amount of said compound is in the range from 100 to 50,000 parts per million.

3. The carbonate composition as set forth in claim 1 wherein the amount of said compound is in the range from 2500 to 15,000 parts per million.

4. The carbonate composition as set forth in claim 1 wherein the amount of said compound is in the range from 5000 to 10,000 parts per million.

5. The carbonate composition as set forth in claim 1 wherein the linolenic compound is an alkyl ester of linolenic acid.

6. The carbonate composition of claim 5 wherein the alkyl ester is methyl linolenate.

7. The carbonate composition as set forth in claim 1 wherein the linolenic compound is an amide of linolenic acid.

* * * * *